(12) United States Patent  
Liu et al.

(10) Patent No.: US 11,762,266 B2
(45) Date of Patent: Sep. 19, 2023

(54) INTERFERENCE LENS AND PROJECTION AMBIENT LAMP

(71) Applicant: Zhongshan BO LONG Electronic Technology Co., Ltd., Zhongshan (CN)

(72) Inventors: Kexian Liu, Zhongshan (CN); Yong Huang, Zhongshan (CN); Gang Wang, Zhongshan (CN)

(73) Assignee: Zhongshan BO LONG Electronic Technology Co., Ltd., Zhongshan (CN)

( * ) Notice: Subject to any disclaimer, the term of this patent is extended or adjusted under 35 U.S.C. 154(b) by 0 days.

(21) Appl. No.: 17/827,716

(22) Filed: May 29, 2022

(65) Prior Publication Data

US 2023/0229066 A1  Jul. 20, 2023

(30) Foreign Application Priority Data

Jan. 19, 2022 (CN) .......................... 202210061389.5

(51) Int. Cl.
*G03B 21/14*  (2006.01)
*G03B 21/20*  (2006.01)

(52) U.S. Cl.
CPC ......... *G03B 21/147* (2013.01); *G03B 21/208* (2013.01)

(58) Field of Classification Search
None
See application file for complete search history.

(56) References Cited

U.S. PATENT DOCUMENTS

2022/0299858 A1* 9/2022 Li .................. G02B 5/1814

FOREIGN PATENT DOCUMENTS

| CN | 112728465 A | 4/2021 |
| CN | 214468328 U | 10/2021 |
| DE | 102012012621 A1 | 1/2014 |
| JP | 2011164433 A | 8/2011 |

* cited by examiner

*Primary Examiner* — Bao-Luan Q Le
*Assistant Examiner* — Danell L Owens
(74) *Attorney, Agent, or Firm* — Bayramoglu Law Offices LLC

(57) ABSTRACT

An interference lens and a projection ambient lamp are provided. The interference lens includes: an interference sheet with a first surface and a second surface opposite to the first surface, the first surface being a rough surface; and a reflective film provided at the interference sheet; wherein light is reflected by the reflective film to form an interference pattern. The projection ambient lamp includes the foregoing interference lens, a light source and a focusing lens; light emitted from the light source passes through the interference lens and is reflected by the reflective film to form an interference pattern, which is focused by the focusing lens and projected on a medium. The present disclosure realizes simplification of the structure by providing a reflective film at the interference lens, hence utilization of light energy is higher, power consumption is lower, manufacturing cost is lower, and projection effect is better.

14 Claims, 4 Drawing Sheets

INTERFERENCE LENS AND PROJECTION AMBIENT LAMP

CROSS REFERENCE TO THE RELATED APPLICATIONS

This application is based upon and claims priority to Chinese Patent Application No.: 202210061389.5, filed on Jan. 19, 2022, the entire contents of which are incorporated herein by reference.

TECHNICAL FIELD

The present disclosure relates to the technical field of projection lamps, and in particular to an interference lens and a projection ambient lamp.

BACKGROUND

Projection ambient lamp is a type of lamp which is able to project patterns on walls, floors, curtains, etc. The ambient lamp is usually applied in theaters, studios, bars, discos and other stage entertainment scenes, and can project patterns with a single-color or multi-color, water waves, stars or various lines, thus creating a warm and romantic immersive scene. With continuous progress and development of society, people's living standards have been continuously improved, and the ambient lamp has gradually entered thousands of households.

Ambient lamp in the prior art often realizes projection of patterns by transmitting light through a decorative cover printed with patterns. In order to avoid monotonous projection style, the ambient lamp in the prior art is sometimes equipped with one or more water-ripple patterned sheet rotatable relative to the light source, such that light is transmitted to a focusing lens and then projected to make image, thereby producing various effects such as flow of star river, water ripples, etc. Ambient lamp sometimes also uses interference lenses and reflectors for reflection, so light is reflected and then projected to a focusing lens for projection imaging. Light beam is refracted for many times, reflected and refracted again via the interference lenses and reflectors, and is then amplified through a lens, which is driven by a motor to rotate, finally presenting a soft and layered dynamic starry sky effect.

In the above schemes, optical lenses and motors are utilized to achieve dynamic projection effect; however, an internal structure of the ambient lamp is complex, and multiple refractions and reflections of the light beam increase the loss of light source, which may lead to dark imaging or shell light leakage, affecting the user experience.

SUMMARY

In order to solve or at least partially solve the above technical problems, the present disclosure in one aspect provides an interference lens for use in a projection ambient lamp, including: an interference sheet including a first surface and a second surface opposite to the first surface, the first surface being a rough surface; a reflective film provided at the interference sheet; wherein light is reflected by the reflective film to form an interference pattern.

In another aspect, the present disclosure further provides a projection ambient lamp which includes the above interference lenses, a light source and a focusing lens, wherein light emitted by the light source passes through the interference lenses and is reflected by the reflective film in the interference lens to form an interference pattern, which is focused by the focusing lens and projected on a medium.

Compared with the prior art, the ambient lamp of the present disclosure does not need to provide individual reflector and refractive lens, thus making the layout more reasonable and more compact, which contributes to saving materials and reducing costs. Further, the present disclosure can also avoid the loss of light energy caused by multiple refractions and reflections of light, therefore light utilization rate is greatly enhanced, the projected pattern is clearer, the light-emitting efficiency and projection effect is better, contributing to energy-saving and improvement of imaging quality.

BRIEF DESCRIPTION OF THE DRAWINGS

In order to more clearly illustrate embodiments of the present disclosure, a brief description of relevant accompanying drawings will be given below. It is understood that the accompanying drawings in the following description are used to illustrate some embodiments of the present disclosure only, and many other technical features and connection relationships not mentioned herein may be obtained by a person of ordinary skill in the art based on these accompanying drawings.

Reference Signs:

1. interference lens; 11. interference sheet; 12. first surface/rough surface; 13. second surface/flat surface; 14. reflective film; 15. keyhole; 2. light source; 3. focusing lens; 4. motor; 5. transmission member; 51. rotating shaft; 52. key.

DETAILED DESCRIPTION OF THE EMBODIMENTS

Technical solutions in embodiments of the present disclosure will be described in detail below in conjunction with the accompanying drawings.

Inventors of the present disclosure have found that all of the existing ambient lamps utilize refractive lenses to achieve irregular refraction of light path. However, internal structure of such ambient lamps is complex, and light beam is refracted and reflected for several times, which may cause loss of light source and darker imaging or light leakage from shell, thereby affecting the user experience.

In view of this, an interference lens and a projection ambient lamp are provided in the present disclosure so as to simplify structure, improve light source utilization, and reduce manufacturing costs and energy consumption.

Embodiment I

Figure 1:
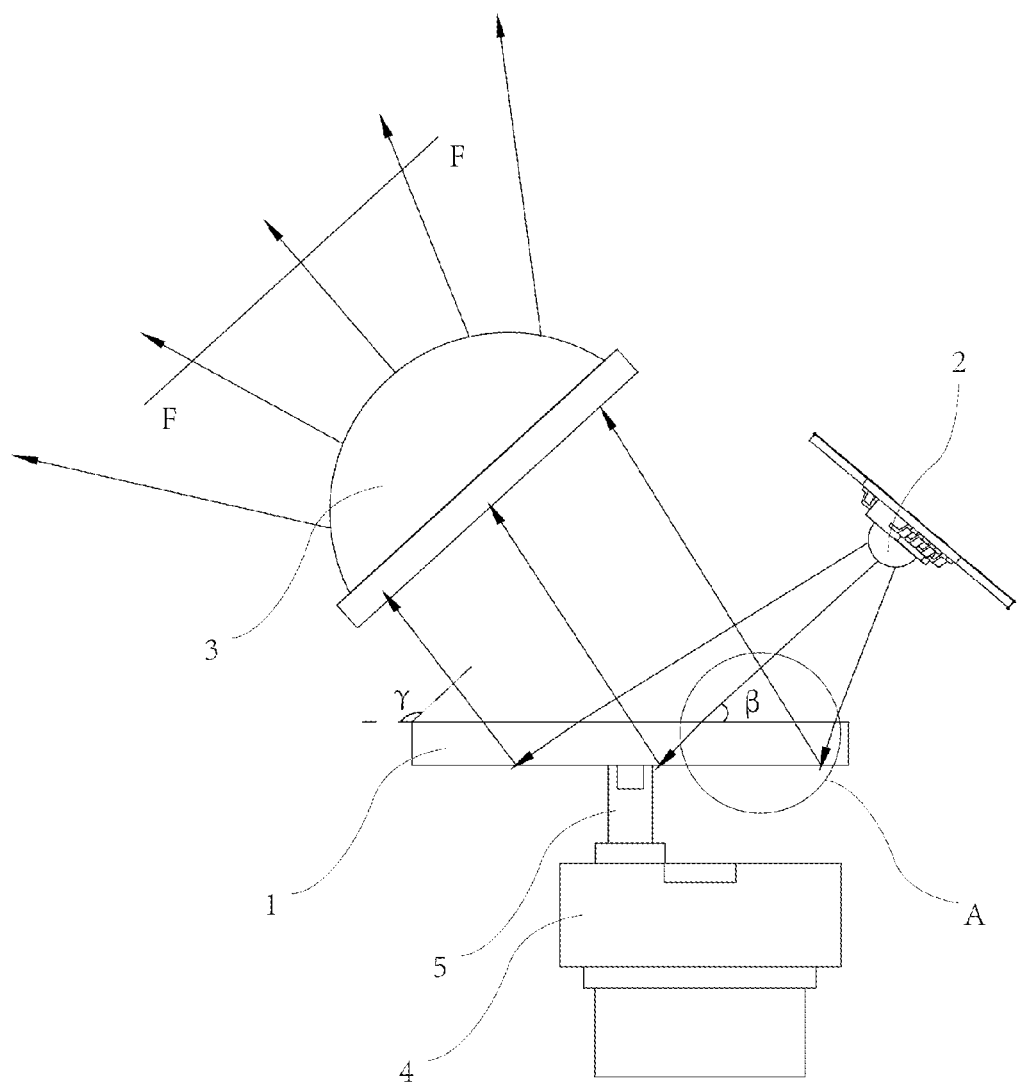
FIG. 1 is a schematic structural view of a projection ambient lamp according to one embodiment of the present disclosure.
Figure 2:
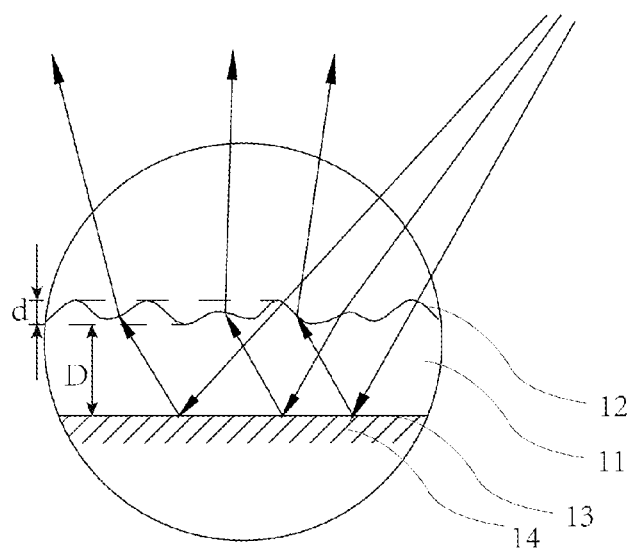
FIG. 2 is a partially enlarged schematic view of part A in FIG. 1 of the present disclosure.

The first embodiment of the present disclosure proposes an interference lens 1 for use in a projection ambient lamp. Referring to FIG. 1 and FIG. 2, the interference lens 1 includes:

an interference sheet 11, which includes a first surface 12 and a second surface 13 opposite to each other, the first surface 12 being a rough surface 12;

a reflective film 14, which is provided at the interference sheet 11;

light is reflected by the reflective film 14 to form an interference pattern.

It is apparent to those of ordinary skill in the art that in physics, "interference" refers to a phenomenon where two or more columns of waves superimpose or cancel with each other when meeting in space, so as to form a new waveform. For example, if a beam splitter were used to split a monochromatic beam into two beams, and the two beams were then allowed to overlap in a certain region in the space, it would be found that the light intensity in the overlapping region is not uniformly distributed, the brightness would vary with its position in space; for example, the light intensity in the brightest place might exceed a sum of light intensities of two original beams, and the light intensity in the darkest place might be zero. Such redistribution of light intensity is referred to as "interference fringes".

Interference sheet 11 can be a transparent water pattern sheet or a sheet structure capable of light transmission and refraction with a water pattern disk, and its material can be glass, resin, PC, etc., the specific choice of which does not limit the present disclosure. Because the interference lens 11 has a rough surface 12, the optical range difference of the refracted light may differ, and the coherent light emitted out from the rough surface 12 superimposes on each other, thereby presenting alternating light and dark interference stripes.

Interference lens can be applied to a projection ambient lamp. In the prior art, interference lens is usually disposed between a lampshade and a light source; light beam first passes through the interference sheet to form interference stripes, and then passes through the lampshade for amplification, therefore the space utilization is low. Alternatively, one side of the interference lens is provided with a lampshade and a light source, the other side is provided with a reflector; light beam is refracted first to the reflector through the interference lens and air between the interference lens and the reflector, and is then reflected to the interference lens through the reflector, and further passes through the interference lens to form interference stripes, and is finally amplified through the lampshade, which is complicated in structure, and there is loss during the multiple reflections and refractions of light.

In view of this, in one embodiment of the present disclosure, referring to FIG. 2, the second surface 13 of the interference sheet 11 is a flat surface 13, the reflective film 14 being disposed on the flat surface; optionally, the reflective film 14 is coated on the flat surface 13 of the interference sheet 11. As a result, light rays are incident to the interference sheet 11 through the rough surface 12, reflected by the reflective film 14 at the second surface 13 of the interference sheet 11, and then emitted out from the rough surface 12, thereby projecting an interference pattern. Where the light beam is incident on the interference sheet 11, part of the light beam will be directly reflected by the rough surface 12 of the interference sheet 11, and another part of the light beam will be refracted through the interference sheet 11 and reflected by the reflective film 14 and is then emitted out from the rough surface 12, thus projecting the interference pattern.

Figure 3:
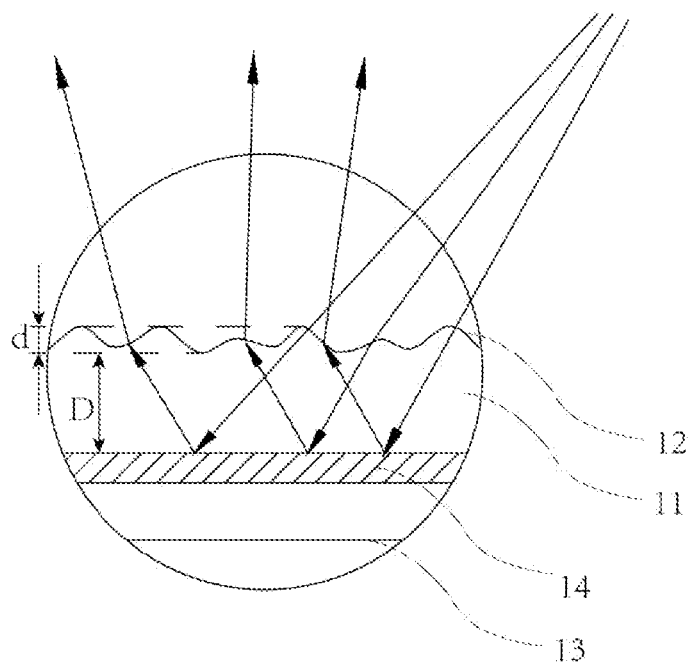
FIG. 3 is a partially enlarged schematic view of an interference sheet in a projection ambient lamp according to another embodiment of the present disclosure.

In another embodiment, referring to FIG. 3, the reflective film 14 is provided inside the interference sheet 11, that is, material of the interference sheet 11 encloses the reflective film 14, or the reflective film 14 is provided between the first surface 12 and the second surface 13 of the interference sheet 11. As such, light rays are incident to the interference sheet 11 through the rough surface 12, reflected by the reflective film 14 inside the interference sheet 11 and are then emitted out from the rough surface 12, thereby projecting an interference pattern. In this case, the second surface 13 of the interference sheet 11 can be a flat surface or a rough surface. Where the second surface 13 of the interference sheet 11 is a rough surface, light can be incident to the interference sheet 11 through the second surface 13, reflected by the reflective film 14 inside the interference sheet 11 and is then emitted out from the second surface 13, thereby projecting an interference pattern. In a specific embodiment, the reflective film 14 disposed inside the interference sheet 11 has a concave and convex structure, i.e., the reflective film 14 is formed into a wave undulating shape. In this case, the second surface 13 of the interference sheet 11 can be a flat surface, and the first surface 12 of the interference sheet 11 can also be a flat surface; light can be incident on the interference sheet 11 through the first surface 12 and the second surface 13, reflected by the reflective film 14 inside the interference sheet 11, and is then emitted out from the first surface 12 and the second surface 13 accordingly, thereby projecting an interference pattern.

Figure 4:
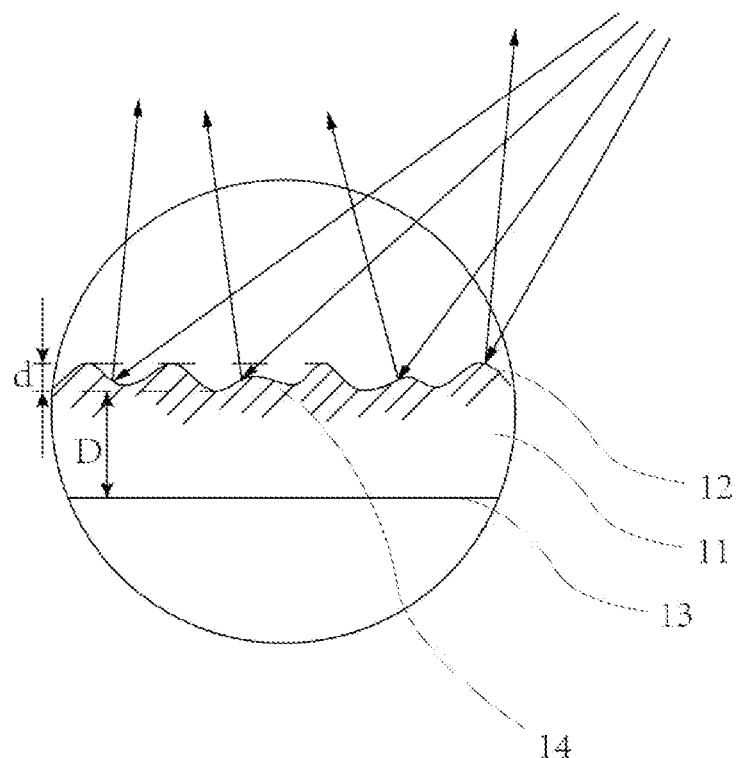
FIG. 4 is a partially enlarged schematic view of an interference sheet in a projection ambient lamp according to a further embodiment of the present disclosure.

In yet another embodiment, referring to FIG. 4, the reflective film 14 is coated on the rough surface 12 of the interference sheet 11. When light beam is irradiated to the interference sheet 11, the light beam does not enter the interior of the interference sheet 11, but is directly incident on the first surface (i.e., the rough surface 12), and is reflected directly by the rough surface 12 of the interference sheet 11. Since the light beams directly reflected by the rough surface 12 involve travel differences, they will likewise interfere with each other and therefore project an interference pattern. In this structure, light rays can be irradiated from the second surface 13 of the interference sheet 11, and pass through the second surface 13 to enter the interference sheet 11; light rays are reflected by the reflective film 14 coated on the rough surface 12, and then emitted out from the second surface 13, to project an interference pattern.

Compared with the prior art, the present disclosure can simplify the structure of the whole projection ambient lamp by employing an interference sheet 11 provided with a reflective film 14, which makes the layout more reasonable and compact, thus saving materials and reducing costs. In addition, refractive indexes of the air and lens are different, so the number of refractions can be reduced to avoid image distortion caused by multiple reflections and refractions and to ensure the imaging effect, so that the interference lens 1 can be better applied to the projection ambient lamp.

Notably, the rough surface 12 can have a plurality of bumps and grooves, where the distance d between the top of a highest bump and the bottom of a deepest groove accounts for 15% to 30% of the thickness D of the interference lens 11. In case the first surface 12 of the interference sheet is a rough surface with a plurality of bumps and grooves, the "thickness D of the interference lens 11" refers to an equivalent thickness of the interference lens 11 at the same volume as when the first surface 12 is flat. The plurality of bumps and grooves as provided can increase the optical range difference of the refracted lights. Here, the value of d can range from 15% D to 30% D, whereby alternation of bright and dark interference stripes is more obvious, and the incident light of same angle can present different refracted lights after passing through the interference sheet 11, making the projected interference pattern have better effects.

Embodiment II

The second embodiment of the present disclosure proposes a projection ambient lamp, which includes the above-mentioned interference lens 1, a light source 2 and a focusing lens 3, wherein light emitted from the light source 2 passes through the interference lens 1, and is reflected by the reflective film 14 in the interference lens 1 to form an interference pattern, which is focused by the focusing lens 3 and projected on a medium.

Referring to FIGS. 1 and 2, when the light beam emitted from the light source 2 is incident to the interference lens 11, part of the light beam will be directly reflected by the rough surface 12 of the interference lens 11, and another part of the light beam will be refracted by the interference lens 11, reflected by the reflective film 14 and then emitted out from the rough surface 12, thereby projecting an interference pattern. The interference pattern is projected on a medium after being focused by the focusing lens 3.

The light source 2 in this embodiment can be a monochromatic light source or an RGB light source, that is, a multi-color light source. The focusing lens can be a cylindrical lens with gradient refractive index having a characteristics of end-focusing and imaging, or can be a lens group consisting of multiple lenses. The target medium for projection can be a ceiling, a wall, a floor, or various other medium, such as water, curtains, etc.

As described above, compared to the prior art, the present disclosure can simplify the structure of the whole projection ambient lamp, making the layout more reasonable and compact, thereby saving materials and reducing costs. In addition, by directly coating on the interference sheet 11 with a reflective film 14 as compared to installation of reflectors, the present disclosure can avoid occurrence of air refraction between the interference sheet 11 and the emitting surface, improve utilization of light energy, reduce energy loss, and prevent dark imaging on the one hand; and on the other hand, refractive indexes between air and lenses are different, thus reducing the number of refractions can avoid image distortion caused by multiple reflections and refractions, and ensure the imaging effect.

Compared with the prior art where strict control of the distance between the reflector and the interference wheel is required, this embodiment does not require a reflector and does not require control of the distance to achieve irregular reflection, so the structure of the whole projection ambient lamp is simpler, which can reduce the assembly and production process, and also reduce costs. In addition, compared with multiple reflections and refractions in the prior art, the present disclosure reduces the number of reflections and refractions, which can reduce power consumption by about 30% under the same illumination, and light loss can be reduced from 40% of the prior art to within 10%, which is more energy-saving and environmentally friendly. Light emitted from the light source 2 passes through the interference lens 1, and is directly reflected to form an interference pattern, and is projected on the medium after being focused by the focusing lens 3, thus improving the utilization of light energy, so that it can project monochromatic or multi-color light which almost maintain light effect of the light source.

Figure 5:
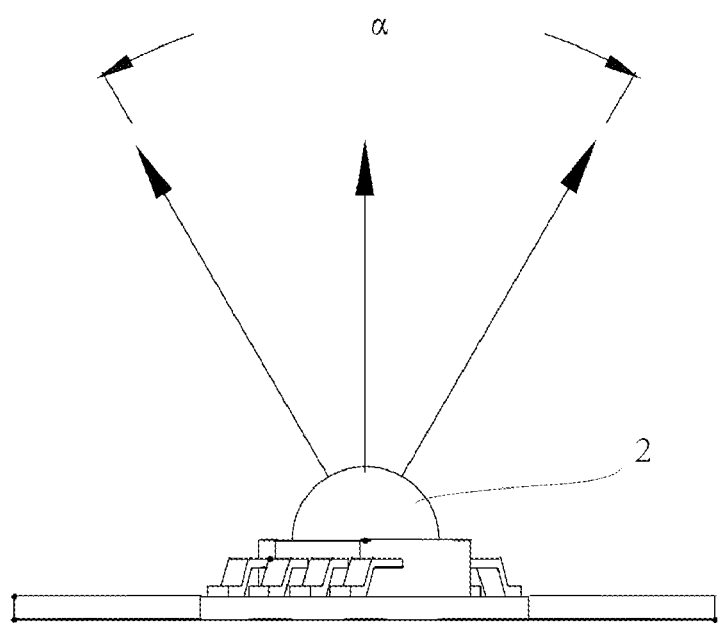
FIG. 5 is a schematic structural view of a light source of a projection ambient lamp according to another embodiment of the present disclosure.

Referring to FIG. 1 and FIG. 5, a divergence angle α of the light source 2 can be in the range of 45° to 70°, and the first angle β between a central axis of the light emitting region of the light source 2 and the interference lens 1 can range from 20° to 70°. By reasonably setting the divergence angle α of the light source 2, and the position of the light source 2 and interference lens 11, uniformity of the size and distribution of the interference pattern projected on the medium after focusing can be controlled, so as to improve the projection effect.

In one embodiment, the first angle β between the central axis of the light source 2 and the interference lens 1 is in the range of 40° to 50°. The first angle β is in the range of 40° to 50°, which can make the structure of the whole projection ambient lamp compact, while achieving better light output efficiency.

Preferably, the second angle γ between a focal plane F-F of the focusing lens 3 and the interference lens 11 is complementary to the first angle β between the central axis of the light-emitting area of the light source 2 and the interference lens 1. The small-scale production test shows that where the second angle γ and the first angle β are complementary to each other, area utilization of the interference lens 1 is higher, and utilization of light energy can be increased by 30% or more, which can effectively reduce light loss.

Embodiment III

In order to bring an immersive experience to the user, inventors of the present disclosure have optimized the design in the above embodiments to further enhance the projection effect of the projection ambient lamp. Specifically in this embodiment, referring to FIGS. 1 and 6, light emitted from the light source 2 covers part of the area of the interference lens 1.

The projection ambient lamp may further include a motor 4 and a transmission member 5 which is connected to the motor 4. The interference lens 1 is mounted on the transmission member 5 and can be driven by the transmission member 5 to rotate.

In this embodiment, the interference lens 1 can be driven to rotate through the cooperation of the motor 4 and transmission member 5, so as to achieve a variety of effects such as flow of stars, water waves, etc., to avoid the problem of monotonous projection style. In addition, compared to the case where light emitted from the light source 2 covers the entire area of the interference lens 1, light emitted from the light source 2 in this embodiment covers only part of the interference lens 1, therefore the projection on the medium has more variations as the interference lens 1 is rotated, thus making the rotation of the projection more realistic.

Notably, interference lens in the prior art is often provided with a through-hole, and the transmission member is fixed in the through-hole of the interference lens by screws. This creates an occlusion, and the transmission member would block the light through the interference lens, making the imaging have dark areas. In view of this, referring to FIG. 6, the interference lens 1 in this embodiment can be provided with a keyhole 15, and the transmission member 5 can include a rotating shaft 51, which is connected to the motor 4 to rotate along its own axis. An end of the rotating shaft 51 is provided with a key 52, which is non-rotatably connected to the keyhole 15, i.e., the key 52 cannot rotate with respect to the keyhole 15. In one embodiment, the keyhole 15 is provided in the center of the interference lens 1 or at the gravity center of the interference lens 1, so that the rotating shaft 51 of the transmission member 5 can well support the interference lens 1 and keep balance of the interference lens 1, so that it is not prone to deflection.

The transmission member 5 and the interference lens 1 are connected by the key 52 and the key hole 15, so that no additional process is needed, and dark area can be avoided, thereby improving projection effect of the projection ambient lamp. Among other things, the key 52 can be connected to the keyhole 15 by screw fixing, snap connection, glue bonding, etc. Specifically, the key 52 can be a spline or a flat key. In one embodiment, the key 52 has a D-shaped cross-section or two outer sides parallel to each other, and accordingly, the keyhole 15 has a D-shaped cross-section or two inner sides parallel to each other.

Figure 6:
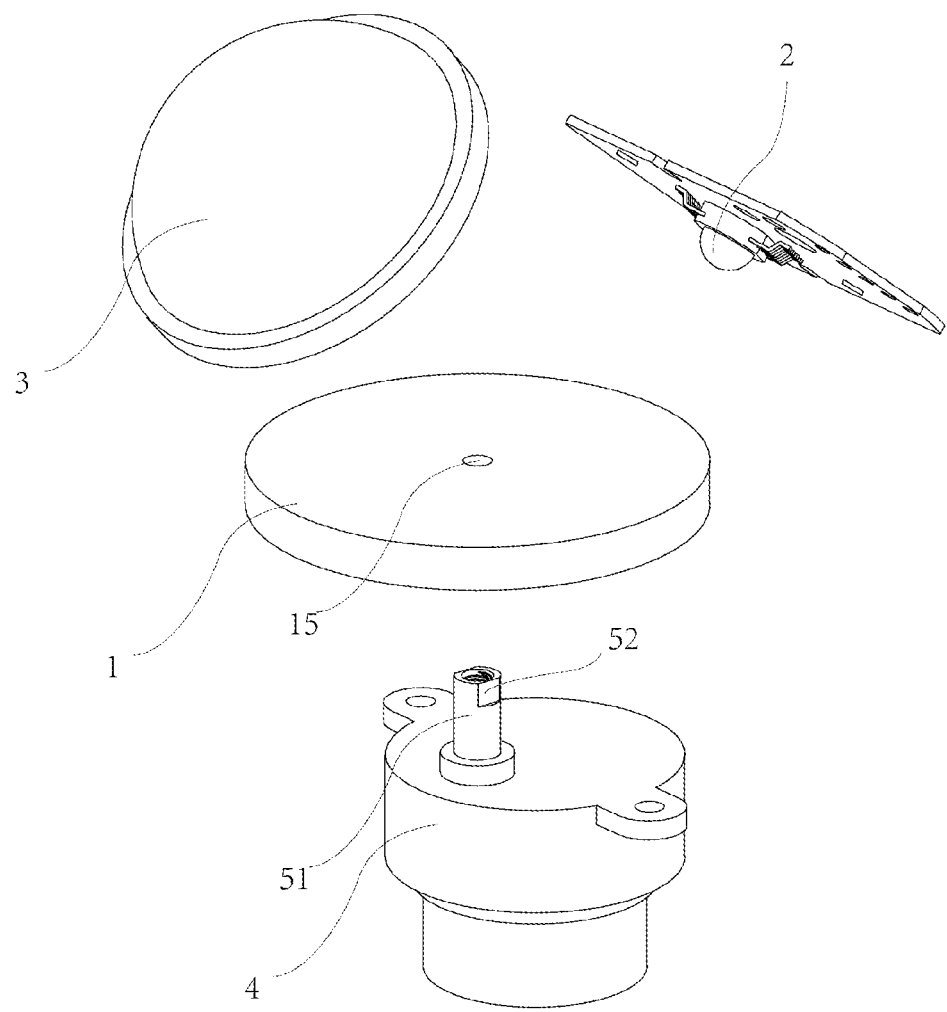
FIG. 6 is an exploded schematic view of a projection ambient lamp according to a further embodiment of the present disclosure.

In this embodiment, the keyhole 15 may be a through hole as shown in FIG. 6 or may be a blind hole, and the keyhole 15 may be opened in the second surface 13 of the interference sheet 11. In one embodiment, where the keyhole 15 is a blind hole, both the side and bottom walls of the keyhole 15 can be coated with a reflective film 14. The reflective film 14 there can eliminate dark field which may result from the absence of reflected light in the area of keyhole 15, and thus improve the projection effect of the projection ambient lamp.

In actual use, light beam emitted from the light source 2 is partly reflected by the rough surface 12 of the interference lens 1 directly, and also partly refracted by the interference lens 1. Most of the refracted light is reflected by the reflective film 14 set on the flat surface 13 of the interference sheet 11, and then emitted out from the rough surface 12, and a small part is reflected by the reflective film 14 set on the surface of the keyhole 15 and then emitted out from the rough surface 12. During the reflection and refraction, countless light rays with different angles can be formed, which form interference patterns by superimposing on each other and are projected on the medium after being focused by the focusing lens 3. In this embodiment, the interference lens 1 can be driven to rotate through the motor 4 and the transmission member 5, so as to realize various effects such as flow of star river and water rippling, which improves the projection effect.

Compared with the prior art, the present disclosure can simplify the structure of the whole projection ambient lamp, making the layout more reasonable and compact, thus saving materials and reducing costs. On the other hand, the refractive indexes of the air and lens are different, thus reducing the number of refractions can avoid image distortion caused by multiple reflections and refractions, can ensure the imaging effect, and can improve the user experience.

It is apparent to those skilled in the art that the present disclosure is not limited to the details of the exemplary embodiment described above, and can be realized in other specific forms without departing from the spirit or essential features of the present disclosure. Thus, the embodiments of the present disclosure shall be taken as exemplary and non-limiting from any perspective. The scope of the present disclosure is limited by the appended claims and not by the above description, and is intended to encompass all variations falling within the spirit and scope of the equivalent elements of the claims. Also, any appended marking in the claims shall not be considered as limiting the claims involved.

What is claimed is:

1. An interference lens for use in a projection ambient lamp, comprising:
an interference sheet, wherein the interference sheet comprises a first surface and a second surface opposite to the first surface, and the first surface is a rough surface;
a reflective film provided at the interference sheet;
wherein light is reflected by the reflective film to form an interference pattern,
wherein the rough surface has a plurality of bumps and a plurality of grooves, wherein a distance between a top of a highest bump of the plurality of bumps and a bottom of a deepest groove of the plurality of grooves ranges from 15% to 30% of a thickness of the interference sheet.

2. The interference lens according to claim 1, wherein the second surface is a flat surface, the reflective film is provided on the second surface;
the light is incident to the interference sheet through the first surface, and is reflected by the reflective film and emitted out from the first surface.

3. The interference lens according to claim 1, wherein the reflective film is provided on the first surface;
the light is incident to the interference sheet through the second surface, and is reflected by the reflective film and emitted out from the second surface; or the light is directly incident to the first surface, and is reflected by the reflective film to form the interference pattern.

4. The interference lens according to claim 1, wherein the reflective film is provided inside the interference sheet;
the light is incident to the interference sheet through the first surface, and is reflected by the reflective film and emitted out from the first surface; or the light is incident to the interference sheet through the second surface, and is reflected by the reflective film and emitted out from the second surface.

5. A projection ambient lamp, comprising:
the interference lens according to claim 1;
a light source; and
a focusing lens,
wherein light emitted from the light source passes through the interference lens and is reflected by the reflective film in the interference lens to form the interference pattern, and the interference pattern is focused by the focusing lens and projected on a medium,
wherein in the interference lens, the rough surface has a plurality of bumps and a plurality of grooves, wherein a distance between a top of a highest bump of the plurality of bumps and a bottom of a deepest groove of the plurality of grooves ranges from 15% to 30% of a thickness of the interference sheet.

6. The projection ambient lamp according to claim 5, wherein the light source has a divergence angle between 45° and 70°, and a first angle between a central axis of a light-emitting region of the light source and the interference lens is between 20° and 70°.

7. The projection ambient lamp according to claim 6, wherein a second angle between a focal plane of the focusing lens and the interference sheet is complementary to the first angle.

8. The projection ambient lamp according to claim 5, further comprising a motor and a transmission member connected to the motor; wherein the interference lens is mounted on the transmission member and is configured to be driven by the transmission member to rotate.

9. The projection ambient lamp according to claim 8, wherein the interference lens is provided with a keyhole; the transmission member comprises a rotating shaft, the rotating shaft is connected to the motor to rotate along an axis of the rotating shaft; the rotating shaft is provided with a key at an end, the key is non-rotatably connected to the keyhole.

10. The projection ambient lamp according to claim 9, wherein the keyhole is a blind hole, and is opened on the second surface of the interference sheet.

11. The projection ambient lamp according to claim 10, wherein a side wall and a bottom wall of the keyhole are each provided with the reflective film.

12. The projection ambient lamp according to claim 5, wherein in the interference lens,
- the second surface is a flat surface, the reflective film is provided on the second surface;
- the light is incident to the interference sheet through the first surface, and is reflected by the reflective film and emitted out from the first surface.

13. The projection ambient lamp according to claim 5, wherein in the interference lens,
- the reflective film is provided on the first surface;
- the light is incident to the interference sheet through the second surface, and is reflected by the reflective film and emitted out from the second surface; or the light is directly incident to the first surface, and is reflected by the reflective film to form the interference pattern.

14. The projection ambient lamp according to claim 5, wherein in the interference lens,
- the reflective film is provided inside the interference sheet;
- the light is incident to the interference sheet through the first surface, and is reflected by the reflective film and emitted out from the first surface; or the light is incident to the interference sheet through the second surface, and is reflected by the reflective film and emitted out from the second surface.

\* \* \* \* \*